United States Patent [19]

Wackym

[11] Patent Number: 4,652,240

[45] Date of Patent: Mar. 24, 1987

[54] INTERACTIVE TRAINING SYSTEM

[76] Inventor: Phillip A. Wackym, 9342 Hazel Cir., Villa Park, Calif. 92667

[21] Appl. No.: 670,303

[22] Filed: Nov. 13, 1984

[51] Int. Cl.⁴ .............................................. G09B 19/00
[52] U.S. Cl. .................................... 434/118; 434/307; 434/323; 434/335; 434/350
[58] Field of Search .................... 273/DIG. 28, 85 G; 434/307, 323, 335, 336, 350, 118

[56] References Cited

U.S. PATENT DOCUMENTS

| | | | |
|---|---|---|---|
| 4,052,798 | 10/1977 | Tomita et al. | 434/307 |
| 4,060,915 | 12/1977 | Conway | 434/350 |
| 4,095,791 | 6/1978 | Smith et al. | 273/DIG. 28 |
| 4,538,993 | 9/1985 | Krumholz | 434/118 |

OTHER PUBLICATIONS

Hallgren, Richard C., "A Multiple-Machine Loader for Classroom Computers", *Byte*, Oct. 1980.

Primary Examiner—Leo P. Picard

[57] ABSTRACT

A Computer Interactive Training System relates to computer training aids, and in particular, although not exclusive to improving the ability of Instructors to train Students to use computers. The invention gives the instructor the ability to dynamically demonstrate every input being displayed on the Instructors monitor or viewing screen. The inputs (examples) are being generated by the Instructor using a computer. The examples are instantly transmitted to the Students individual monitor or viewing screen which is located directly in front of the Students field of vision.

1 Claim, 11 Drawing Figures

INSTRUCTORS INFORMATION

FROM DISTRIBUTION
AMPLIFIER 18

FROM STUDENTS
COMPUTER 28

TO NEXT STUDENTS
CONTROL DEVICE

POSITION
B

POSITION
A

TO STUDENTS MONITOR 30

TWO POSITION SWITCH 34A

FIGURE 8

INTERACTIVE TRAINING SYSTEM

BACKGROUND OF THE INVENTION

This invention relates to Computer training aids, and in particular, although not exclusive to improving the ability of Instructors to train Students to use computers. The invention gives the Instructor the ability to dynamically demonstrate every input displayed on the Instructors monitor or viewing screen. The input (examples) are being generated by the Instructor using a computer. The examples are instantly transmitted to the Students individual monitor or viewing screen which is located directly in front of the Students field of vision.

The rapid development and use of computers in the work place and home has created a large market for software application packages that enable the non-computer programmer to use computers. These software application packages are stored on some sort of magnetic devices such as disks or tapes. Accompanying these devices are instruction manuals on how to use the software application packages (programs). Depending upon the complexity of the program, the manuals are very extensive and are usually written in a technical style. Two new industries have developed, computer books and training schools. The books attempt to explain in more detail and in a non-technical style the use of computers and the accompanying software.

Computer schools are offered in many forms. All of the schools use Instructors. The Instructors lecture and use different training aids. The most powerful training aid is to demonstrate the actual work being performed using the computer. The monitor or viewing screen is small usually twelve inches measured diagionally. Since the viewing area is limited, the number of observers and the quality of observation is a problem. The question now becomes how do the Students see the examples being developed?

Before any software application program can be "run" on a computer, instructions must be given to the computer. These instructions are entered into the computer by means of a keyboard much like a typewriter. The keyboard is electronic and is controlled by the computer and software. The function of the keys can be changed by the software. For example the "A" is used in a wordprocessing software program to move the cursor one word to the left.

Commands to the computer must be entered *exactly*. Commands and parameters must be separated by delimiters (space, comma, semicolon, equal sign, or tab key). For example COPY A: *.* B:, is a command used in the IBM Disk Operating System that directs the computer to copy all of the files on disk A to disk B.

It is therefore very important the Student be able to see the Instructors example very clearly. The Invention gives the Instructor the ability to place the example on the monitor or viewing screen directly in front of the Students field of vision.

SUMMARY OF THE INVENTION

The invention comprises an Information Distribution Amplifier, a Distribution Network and Students Control Devices. The invention requires a computer, keyboard, monitor or viewing screen, and software application packages (programs).

The Information Distribution Amplifier provides the following:

1. A cable to connect to the Instructor's computer in order to receive information/data.
2. A connector that will accept the mating connector from the monitor or viewing screen's cable.
3. Circuitry necessary to transmit the Instructor's information/data to the Instructor's monitor or viewing screen.
4. Internal integrated circuits connected in such a manner that provides the means to condition the input signals (information/data) for transmission and distribution to the Student's Control Devices.
5. Output connectors for connecting the cables necessary for the networks connecting the Student's Control Devices.
6. Internal regulated power supply.
7. The information/data from the Instructor's computer may be of two electronic signal forms (digital and composite video).

The distribution network consists of cables that have the proper electrical operating characteristics for transmitting the electronic signals (information/data) the required distances and the correct connectors necessary for connecting to the Student Control Device and the Information Distribution Amplifier.

The Student's Control Device consists of a two position six pole switch, proper value terminating resistors, a cable with connector that will connect to the Students computer, a connector that will accept the cable from the Students Monitor or viewing screen, and a connector that will accept the cable from the Information Distribution Amplifier.

The Student Control Device from the Students point of view is very simple; *A two position switch*! Position "A" permits the Student to view the operation of the Students computer on the monitor or viewing screen. Position "B" permits the Student to view the operation of the Instructor's computer on the Student's monitor or viewing screen.

Each network consists of at least one Student Control Device and the maximum number depends upon how the Information Distribution Amplifier is configured. The number of Student positions in the network is controlled by the system "building block" design concept.

The system offers the following advantages:

Focuses Student attention directly to the local screen.
Stimulates Students interest in Instructors example.
Permits direct Student observations of Instructors examples.
Enables Students that understand the example the ability to perform work without disturbing the rest of the class.
A Distribution Network that offers an optimized cable interconnection technique.

BRIEF DESCRIPTION OF THE DRAWINGS

FIG. 8: Internal Flow Diagram Students Control Device

DESCRIPTION OF THE PREFERRED EMBODIMENT

Figure 1:
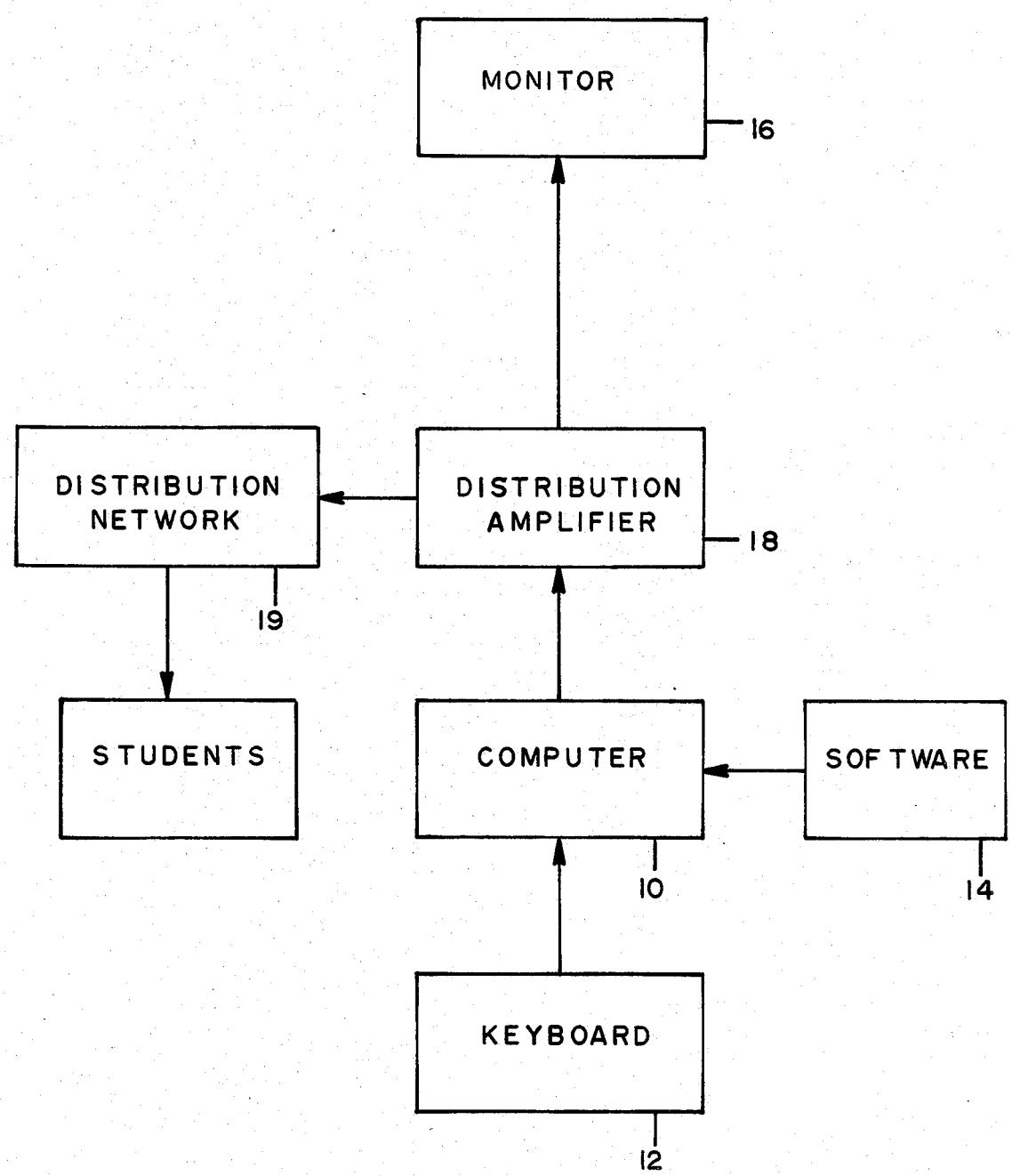
FIG. 1: Overall System Block Diagram Preferred Embodiment

A preferred embodiment which has been selected to illustrate my invention is shown in FIG. 1 and comprises an Instructor's position which contains a computer 10, keyboard 12, software programs 14, monitor or viewing screen 16, an Information Distribution Amplifier 18, and the necessary cables, represented by Distribution Network 19.

To date I have installed a number of Computer Interactive Training Systems in classroom situations and the number of Student Control Devices and/or Student computer positions varies. The size of the room has been the determining factor.

The majority of the Information Distribution Amplifiers delivered to date have the capability of handling sixteen (16) Student Control Devices or Student computer monitor or viewing screens. There is one unit in operation that has the capability of handling twenty-four (24) Student Control Devices and/or Student computer monitor or viewing screen.

The preferred embodiment of the Information Distribution Amplifier has been designed to handle sixteen (16) Student positions. The system "building block" design concept permits the addition of Student positions in increments of four (4).

The Distribution Network consists of cables that have the proper electrical operating characteristics for transmitting the electronic signals (information/data) the required distances and the correct connectors necessary for connecting to the Student Control Devices and the Information Distribution Amplifier.

The Information Distribution Amplifier, Student Control Devices, and Distribution Network have been designed to offer maximum power transfer of signals, minimum signal reflection and therefore high quality of signal image on the Student's monitor or viewing screen; eg. a mirror image of the Instructors monitor or viewing screen.

Figure 2:
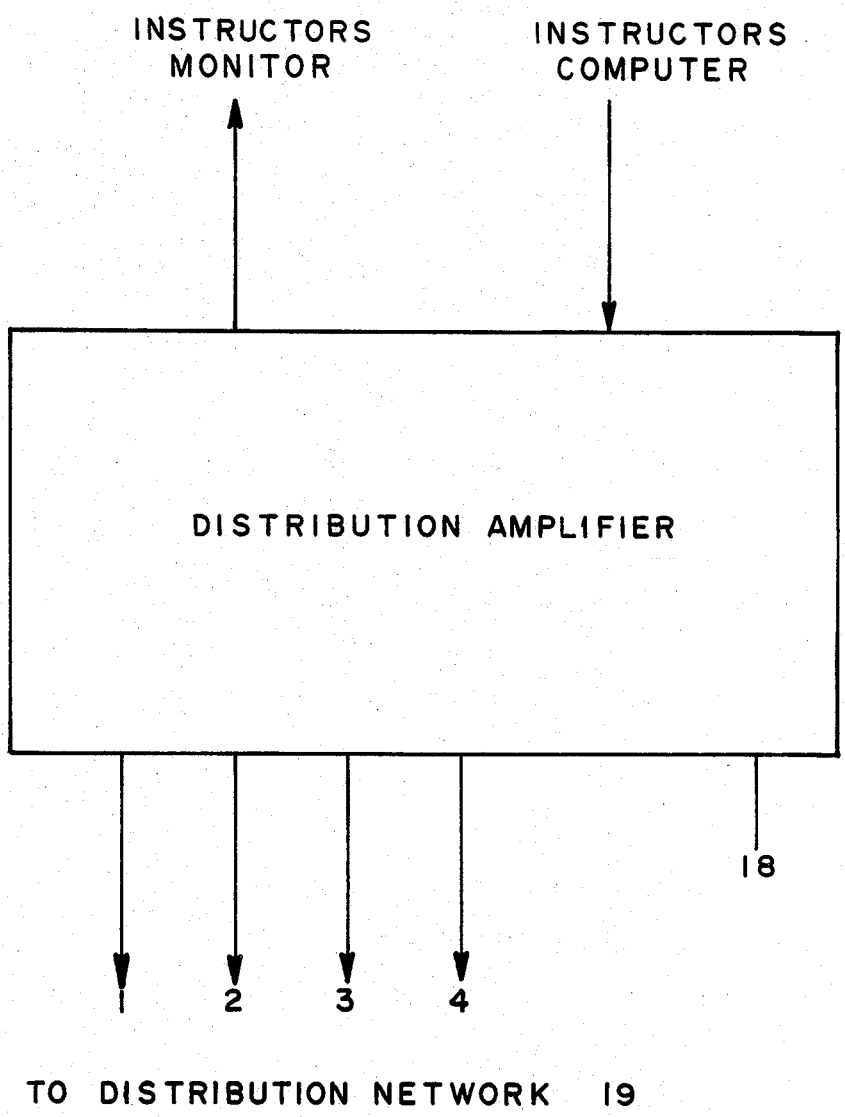
FIG. 2: Block Diagram Information Distribution Amplifier

The preferred embodiment which has been selected consists of a sixteen (16) Student computer network. FIG. 2. indicates the input and output requirements of the Information Distribution Amplifier 18. An internally connected cable marked "C" is connected to the Instructors computer. The Instructors monitor or viewing screen is connected to the Information Distribution Amplifier connector marked "M".

The cable "C" and connector "M" are connected in parallel internally in order for the Instructor's computer to perform normally. There are four outputs shown, each one is connected to a Distribution Network 19 consisting of four Student computer systems. Therefore; the total number of Student computer systems is sixteen.

Figure 3:
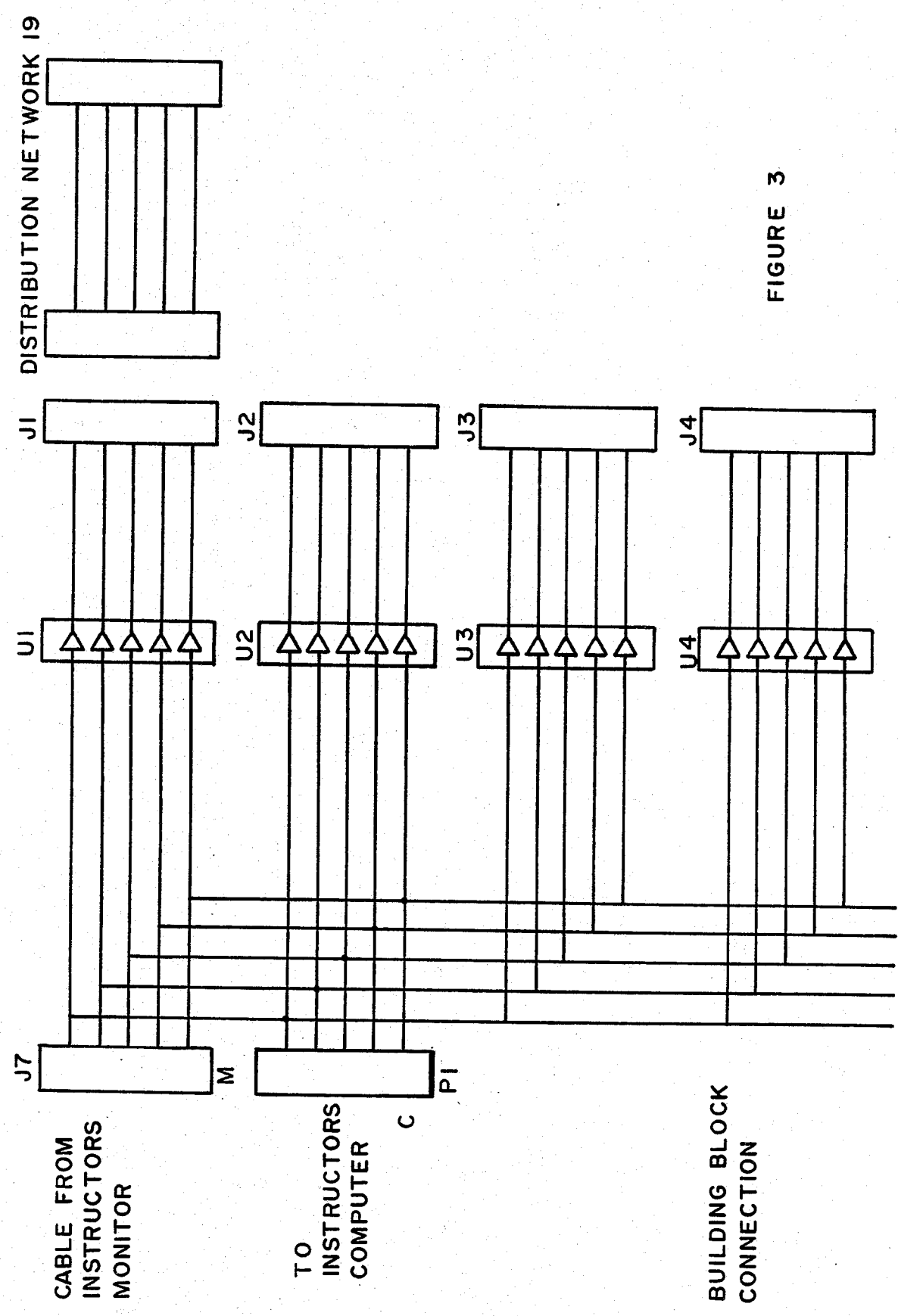
FIG. 3: Schematic Information Distribution Amplifier

Referring to FIG. 3. Schematic Information Distribution Amplifier. The input signals from the Instructor's computer are connected through "P-1" (C) via a bus to the input of the integrated circuits U-1, U-2, U-3, U-4 (which are advanced low-power Schottky Transistor-Transistor Logic [TTL] octal line drivers) in a manner that provides the means to condition the input signals (information/data) for transmission and distribution to the Student Control Devices. Connector "J-7" (M) accepts the cable from the Instructors monitor.

There are four (4) output connectors (J-1, J-2, J-3, J-4). Each connector is connected to an integrated circuit that provides enough capacity to handle information/data for four (4) Student computers.

Figure 4:
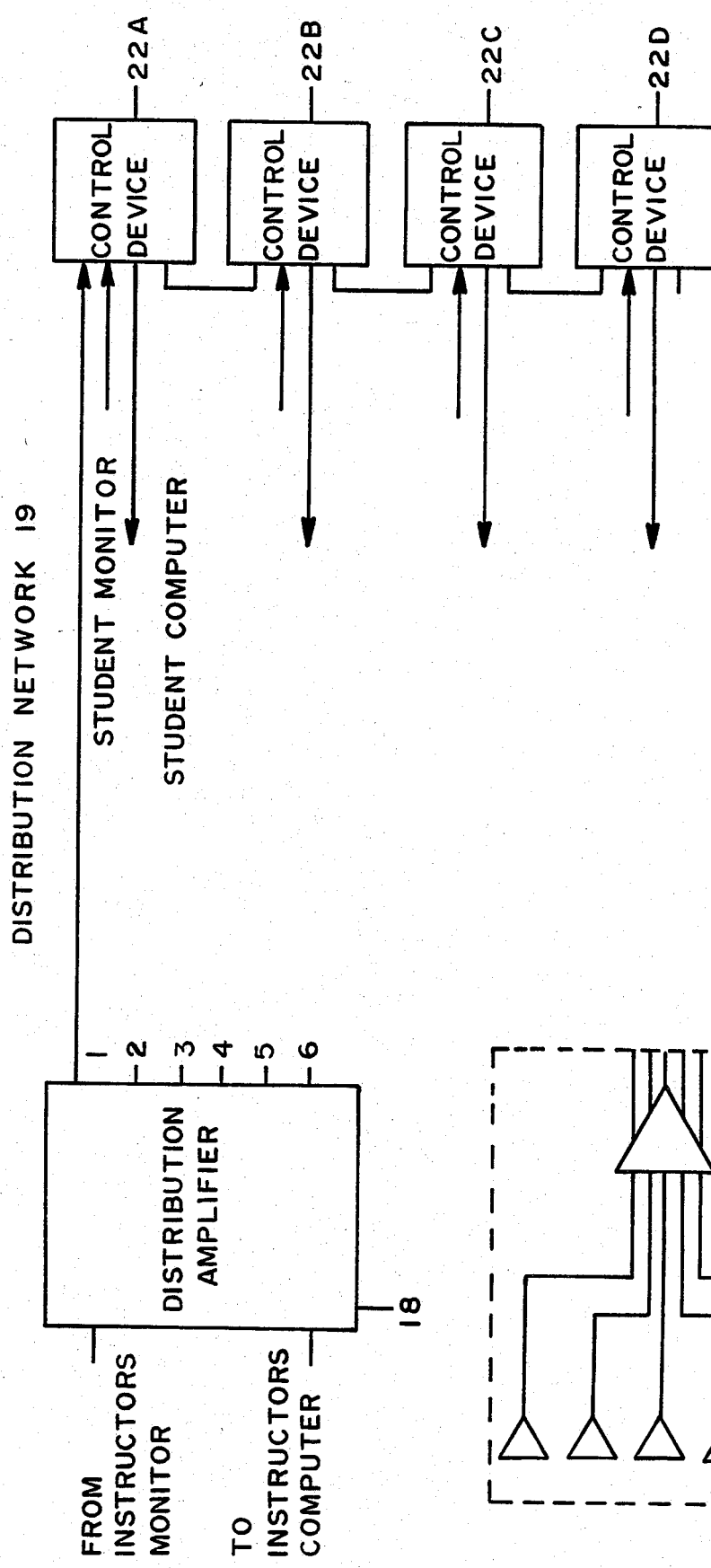
FIG. 4: Schematic Information Distribution System
Figure 4A:
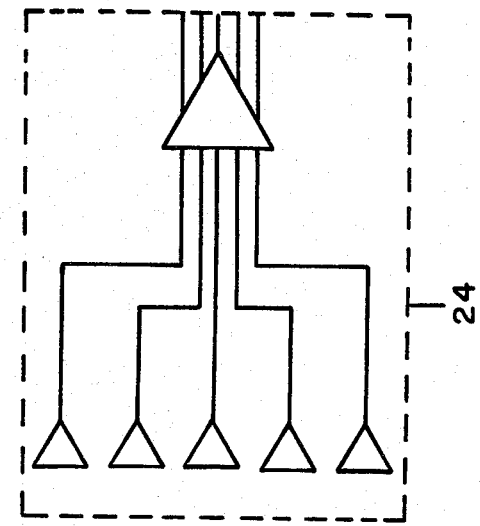

FIG. 4. Information Distribution System shows in greater detail how the system elements are connected. The Information Distribution Amplifier 18 is connected via connector #1 to the Distribution Network 19. The Distribution Network is connected to the first Student Control Device 22a, which is looped to Student Control Device 22b, 22c, and 22d. In a similar manner it is possible to connect a Distribution Network 19 consisting of four Student Control Devices to connectors #2, #3, #4, #5, and #6. The dash enclosed area 24 indicates a typical distribution of the required six signals from the Instructor's computer.

Figure 5:
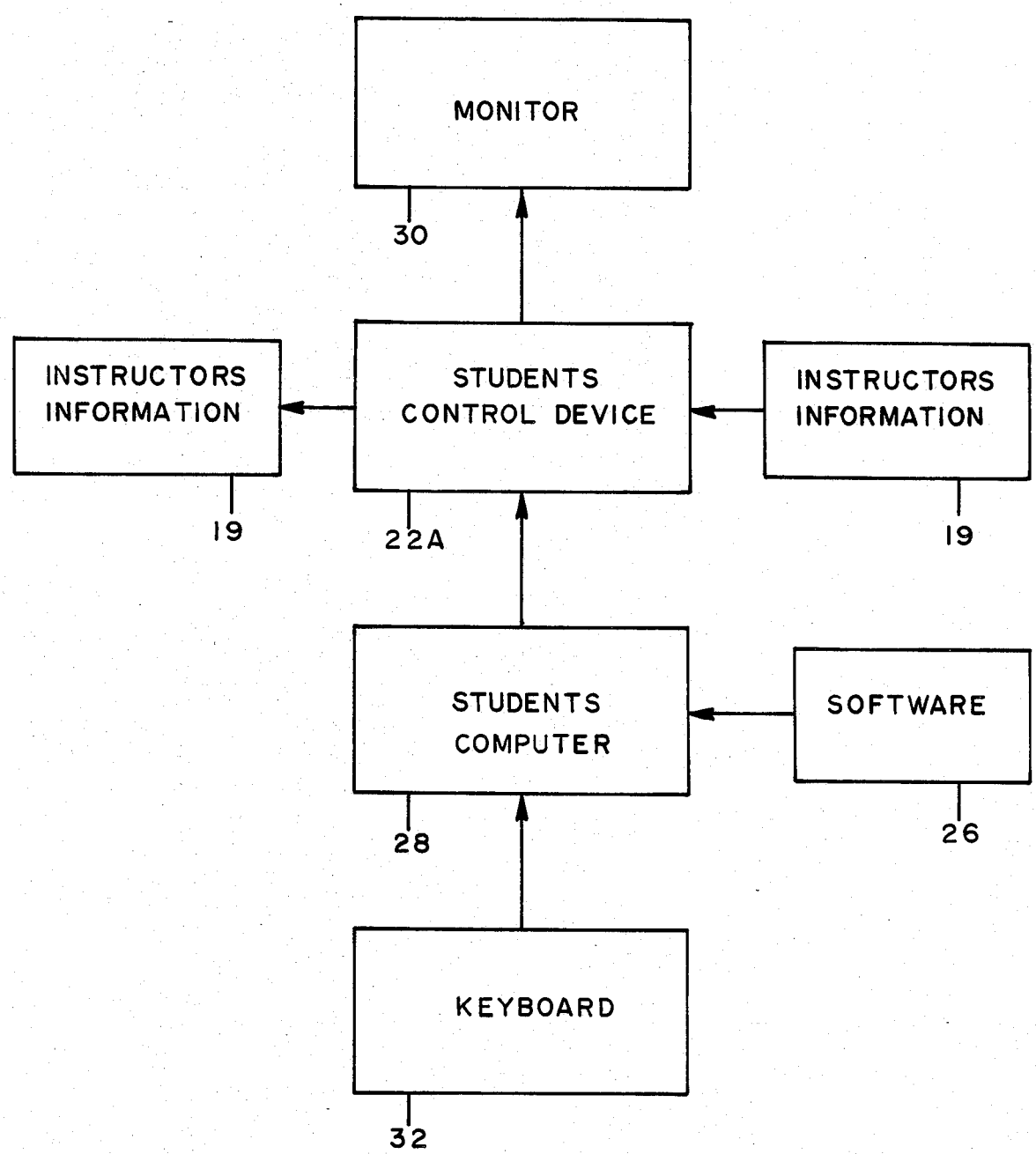
FIG. 5: Block Diagram Typical Students Position

A typical Student position is shown in FIG. 5 and consists of a computer 28, a monitor or viewing screen 30, a keyboard 32, software programs 26, Student Control Device 22a, and the necessary cables in the Distribution Network 19.

Figure 6:
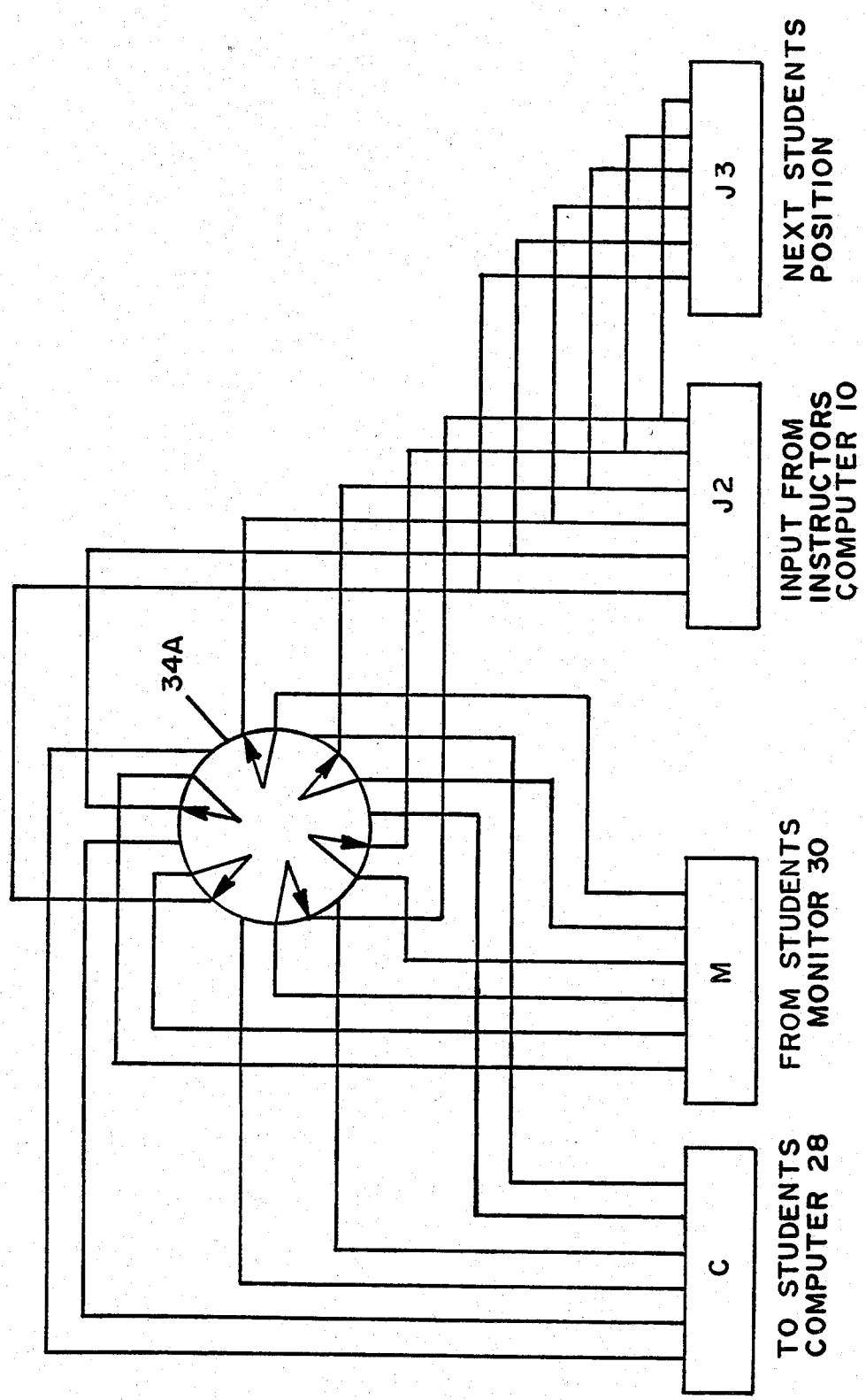
FIG. 6: Schematic Student Control Device

The key element is the Student Control Device 22a shown in FIG. 6. It consists of a two position six pole switch 34a, proper value terminating resistors (R1–R6), a cable (marked "C") with connector that will connect to the Student's computer 28, a connector that will accept the cable from the Information Distribution Amplifier 18, a connector that will permit connection to the next Student position 22b, a connector (marked "M") that will accept the cable from the Student's monitor or viewing screen 30.

Figure 7:
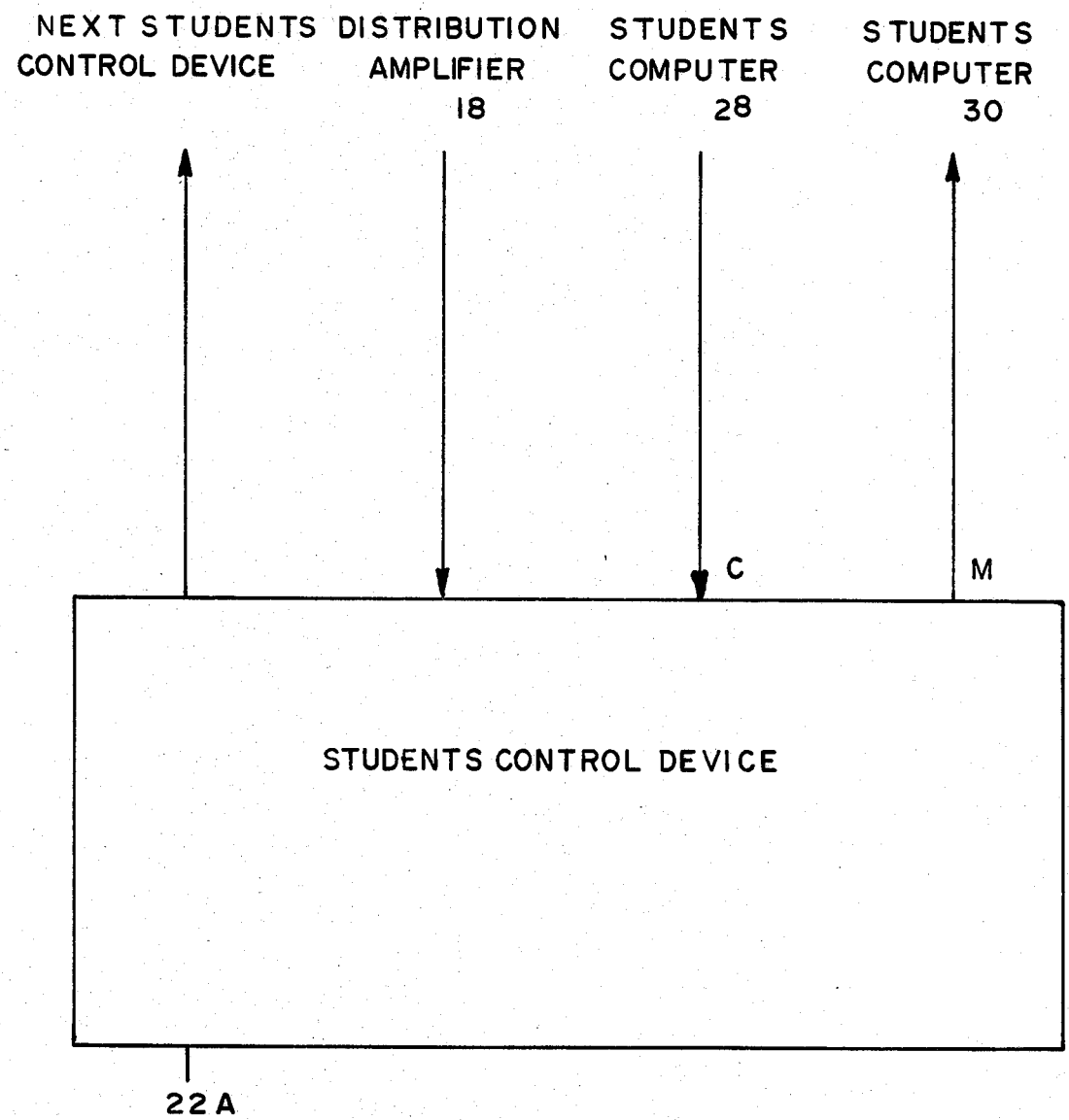
FIG. 7: Flow Diagram Student Control Device

FIG. 7 is a Flow Diagram of the Student Control Device 22a. There are two inputs, one is from the Information Distribution Amplifier 18 containing Instructors information/data and the second is from the Student's computer 28. One output is connected to the Student's Monitor or viewing screen 30 and the other output is optionally connected the the next Student's Control Device 22b. It is possible to connect a maximum of three additional Student Control Devices. Thus having four Student Control Devices in one network. There are no adjustments required when the number of Student Control Devices change.

The internal flow of signal information in the Student Control Device 22a is shown in FIG. 8. The operation is very simple from the Students point of view, *a two position switch 34a*. Position "A" permits the Student to view the operation of the Students computer on the monitor or viewing screen 30. Position "B" permits the Student to view the operation of the Instructor's computer on the Student's monitor or viewing screen 30.

Figure 9:
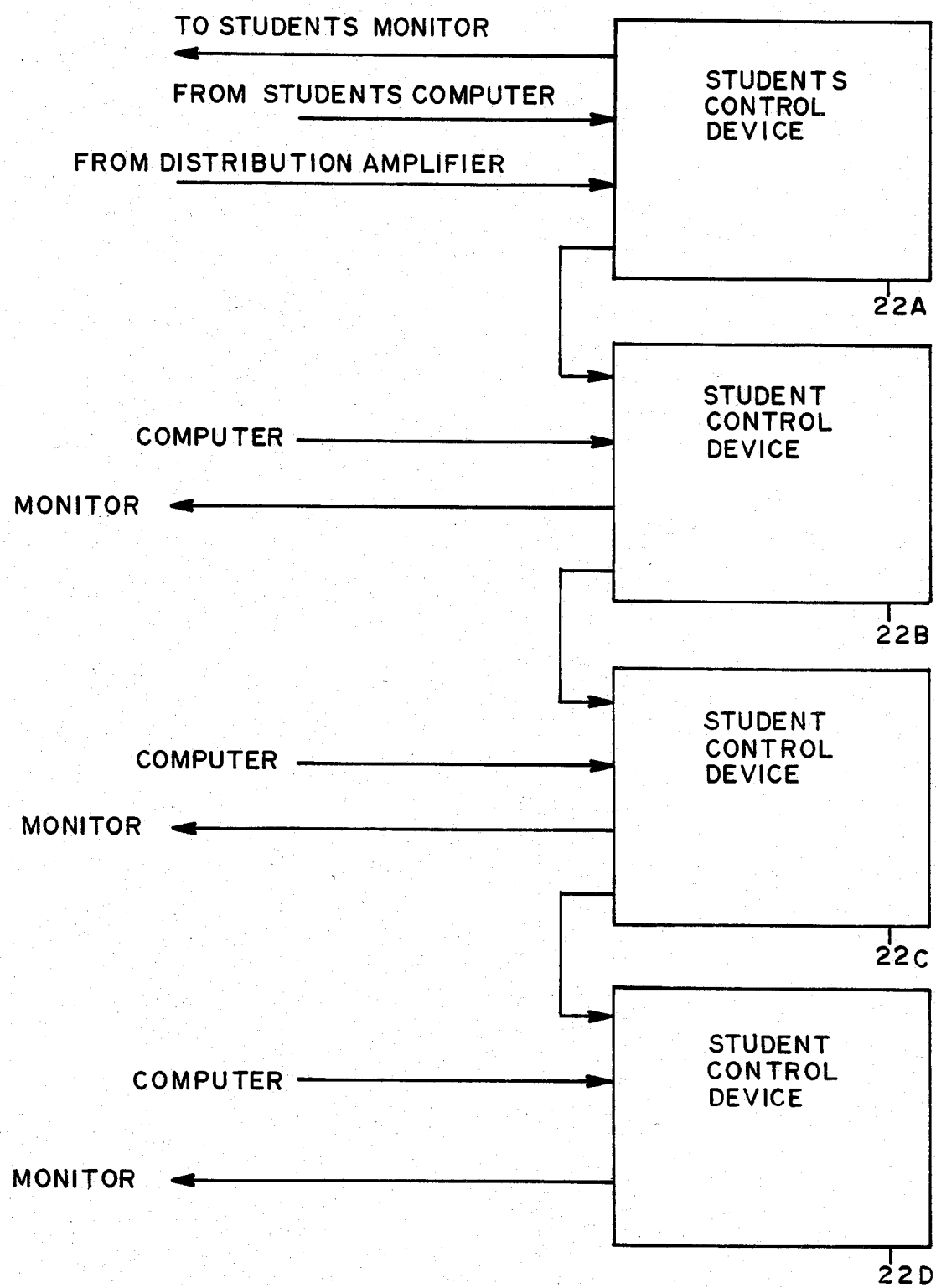
FIG. 9: Branch Network for Four Students Position

A branch network of four Students positions is shown in FIG. 9. Only one cable is required from the Information Distribution Amplifier 18 and is shown connected to Student Control Device number 22a. The input connector and the output connector are connected in parallel which provides the means to loop two Student Control Devices together. Student Control Devices 22a, 22b, 22c, and 22d are shown looped in one network.

The looping feature is unique to the design and offers the advantage of reducing the number of long cables from the Information Distribution Amplifier to the Student positions. The aesthetics of the room will be improved and the elimination of safety hazards in the case of surface mounted cables.

All of the cable used in the system has been chosen to handle the high frequency signals. In the case of the preferred embodiment, the signal is digital at standard TTL levels operating up to 15.75 megahertz.

The three signals are as follows:

1. Video Signal

Maximum video bandwidth of 14 megahertz.

Red, green, and blue signals and intensity are independent.

2. Vertical Drive

Screen refreshed at 60 hertz with 200 vertical lines of resolution.

3. Horizontal Drive

Positive-level TTL-compatibility, at a frequency of 15.75 kHz.

The invention offers maximum power transfer of signals, minimum signal reflection and therefore high quality of signal image on the Students monitor or viewing screen; e.g. A mirror image of the Instructors monitor or viewing screen. The distribution network offers an optimized cable interconnection technique.

The preferred embodiment is a proven design that is currently in operation in DunsPlus Educational Centers in Stamford, Conn., Los Angeles, Calif., San Mateo, Calif., Chicago, Ill., and New York, N.Y.

Prudential Insurance Company has a system installed in their Corporate training facility located in Roseland, N.J.

I invented, built, demonstrated and sold these systems within the last six to nine months.

Figure 10:
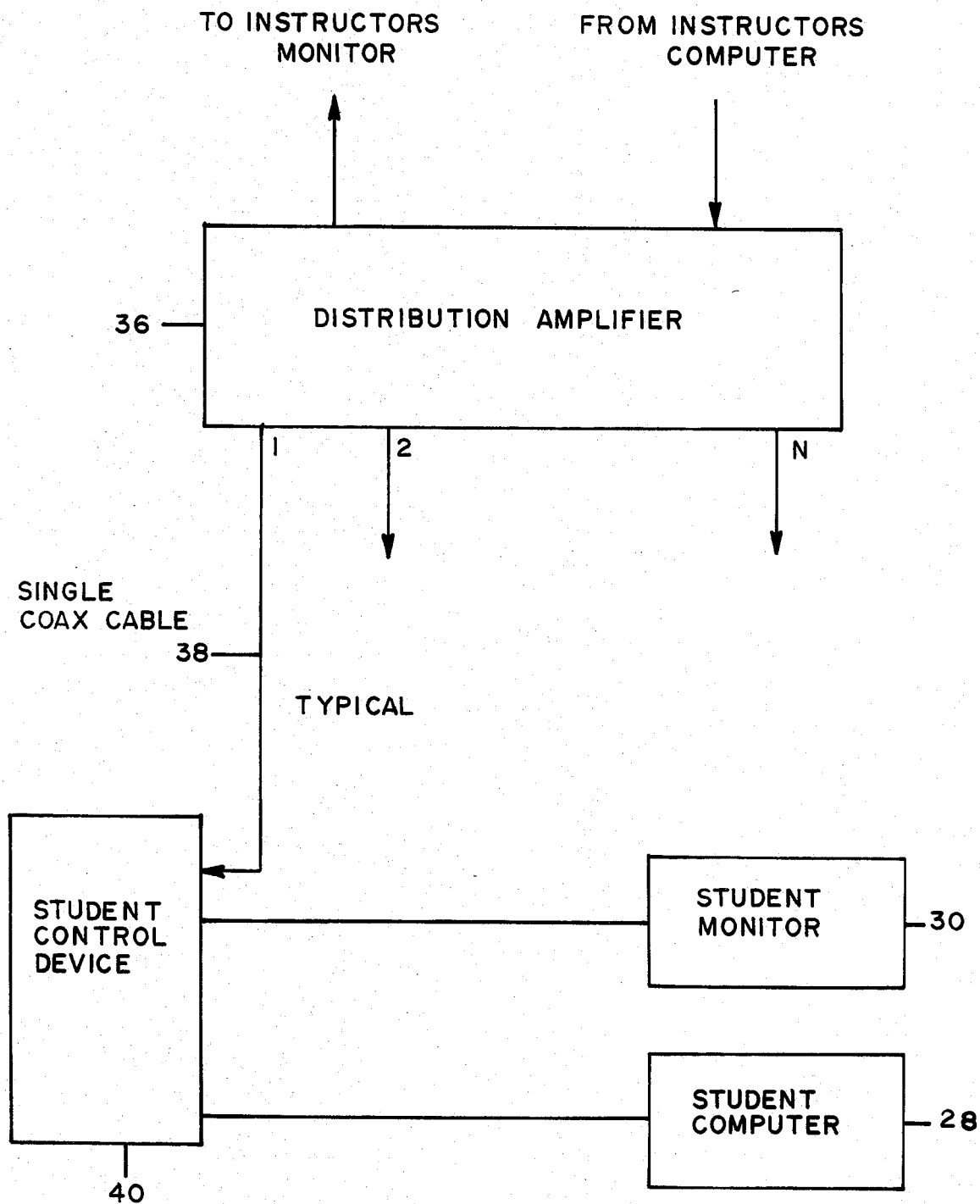
FIG. 10: Block Diagram Alternate Design

The preferred embodiment has been selected to illustrate my invention. An alternate design would be connected as shown in FIG. 10. In order for the alternate design to function, it is necessary for the computer output to be composite video. The Information Distribution Amplifier and monitor must be capable of processing composite video. The composite video signal can be either color or black and white. For example, use a separate Information Distribution Amplifier output for each Student's monitor or viewing screen. Then connect a separate cable for *each* Students Control Device (which can now be reduced to a special two position switch that is different from the Student Control Device 22a shown in FIG. 6.). The number of Student positions depends upon the output capability of the Information Distribution Amplifier.

The alternate design would differ only in the technique of cabling 38, the Information Distribution Amplifier 36, and the Student Control Device 40. The Student Monitor 30 and Student Computer 28 would be connected to the Student Control Device 40 in the same fashion as the preferred embodiment.

The alternate design which handles and processes black and white composite video signals is being used by National Training Systems in their training facilities in New York, N.Y., and Australia.

I also invented, built, demonstrated and sold these systems within the last six to nine months.

Figure 11:
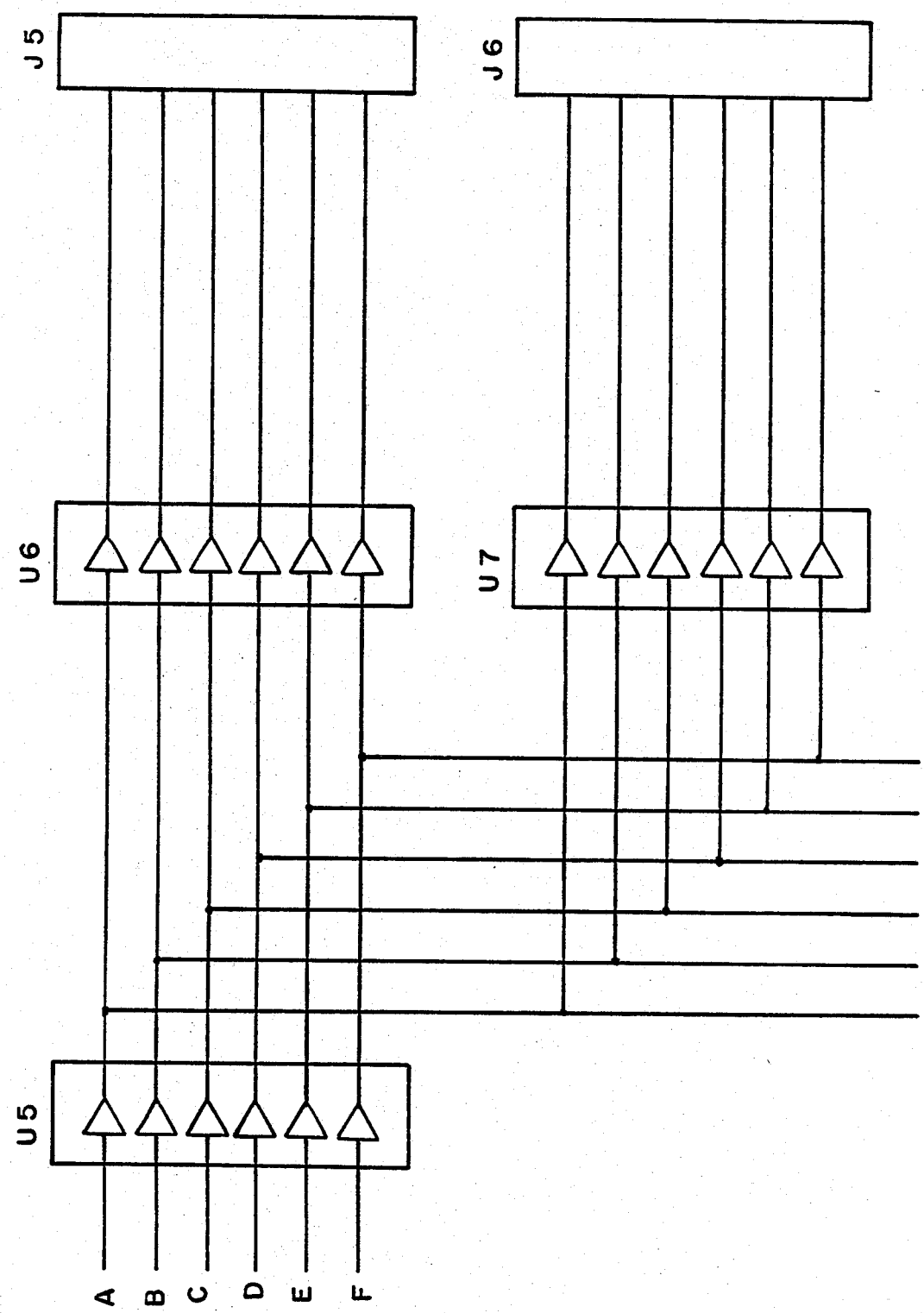
FIG. 11: Schematic Circuit Required for "building block."

The "building block" design concept provides the opportunity to expand the number of Student training positions in the system. FIG. 11 is a schematic of the required additional integrated circuits (IC's). IC U-5 can be connected to the "building block" connection shown in FIG. 3 schematic Information Distribution Amplifier. Wires labeled A, B, C, D, E, and F are connected to pins 2, 4, 6, 8, 11, and 13 of IC U-5. The addition of these IC's expands the output capability of the Information Distribution Amplifier by eight Student positions. It is posible to add two additional IC's to the output of U-5; thus adding eight Student positions. Making a grand total of 16 additional Student positions.

I claim:

1. A computer interactive training system comprising: an instructor's station including a computer, a monitor and a keyboard; a plurality of student's stations each including a computer, a monitor, a keyboard and a control means for permitting the student to selectively display on the student's monitor data from the instructor's computer or data from the student's computer; an information distribution amplifier interconnecting said instructor's station with each of said plurality of student's stations; and a distribution network interconnecting each student control means with said information distribution amplifier; the improvement residing in said control means wherein each said control means comprises a two position switch operable by a student, a first position of said switch connecting the associated student's monitor to the instructor's computer and the second position of said switch connecting the associated student's monitor to the associated student's computer.

* * * * *